US012591156B2

(12) United States Patent
Lin et al.

(10) Patent No.: US 12,591,156 B2
(45) Date of Patent: Mar. 31, 2026

(54) LIQUID CRYSTAL DISPLAY

(71) Applicant: Polyfilm Optronics Corporation, Taoyuan City (TW)

(72) Inventors: Chien-Cheng Lin, Taoyuan City (TW); Yu-Hsun Liao, Taoyuan City (TW)

(73) Assignee: Polyfilm Optronics Corporation, Taoyuan City (TW)

( * ) Notice: Subject to any disclaimer, the term of this patent is extended or adjusted under 35 U.S.C. 154(b) by 0 days.

(21) Appl. No.: 18/922,327

(22) Filed: Oct. 21, 2024

(65) Prior Publication Data

US 2026/0016722 A1 Jan. 15, 2026

(30) Foreign Application Priority Data

Jul. 9, 2024 (TW) ................................. 113125589

(51) Int. Cl.
*G02F 1/13357* (2006.01)
*G02F 1/1335* (2006.01)

(52) U.S. Cl.
CPC .. *G02F 1/133603* (2013.01); *G02F 1/133536* (2013.01); *G02F 1/133553* (2013.01)

(58) Field of Classification Search
CPC ......... G02F 1/133603; G02F 1/133536; G02F 1/133553
See application file for complete search history.

(56) References Cited

U.S. PATENT DOCUMENTS

| | | | | |
|---|---|---|---|---|
| 6,157,486 A | * | 12/2000 | Benson, Jr. ............ | G02B 5/287 |
| | | | | 359/530 |
| 2011/0176328 A1 | * | 7/2011 | Anandan ........... | G02F 1/133617 |
| | | | | 977/773 |
| 2016/0070137 A1 | * | 3/2016 | You ................... | G02F 1/133609 |
| | | | | 349/71 |
| 2020/0395516 A1 | * | 12/2020 | Chen .................... | H10H 20/855 |

FOREIGN PATENT DOCUMENTS

| | | | | | |
|---|---|---|---|---|---|
| CN | 113839294 A | * | 12/2021 | ........... | H01S 3/0405 |
| JP | 2018206598 A | | 12/2018 | | |
| KR | 20090109874 A | * | 10/2009 | .......... | H10K 59/876 |
| KR | 20200037870 A | * | 4/2020 | .......... | G02B 6/0036 |

* cited by examiner

*Primary Examiner* — Lucy P Chien
(74) *Attorney, Agent, or Firm* — Li & Cai Intellectual Property Office

(57) ABSTRACT

A liquid crystal display includes a backlight module, a reflective filter film, and a wavelength conversion film. The backlight module includes a plurality of light-emitting diodes that can emit a first light. The reflective filter film is disposed on the backlight module to receive the first light. The reflective filter film allows light beams within a first wavelength range to at least partially pass therethrough. The first wavelength range is between 370 nanometers and 450 nanometers. The reflective filter film can at least partially block light beams within a second wavelength range from passing therethrough and reflecting the same. The second wavelength range is between 450 nanometers and 900 nanometers. The wavelength conversion film is disposed on (Continued)

a side of the reflective filter film away from the backlight module, and can convert a wavelength of the first light to form a second light.

10 Claims, 5 Drawing Sheets

LIQUID CRYSTAL DISPLAY

CROSS-REFERENCE TO RELATED PATENT APPLICATION

This application claims the benefit of priority to Taiwan Patent Application No. 113125589, filed on Jul. 9, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display device, and more particularly to a liquid crystal display.

BACKGROUND OF THE DISCLOSURE

In the related art, LED backlighting of liquid crystal displays can be categorized into edge-lit and direct-lit backlighting.

For example, referring to FIGS. 1 and 2, a conventional liquid crystal display R based on a direct-lit LED backlight includes a backlight module R1, an optical film R2 (e.g., a diffusion film, a diffusion sheet, or a prism sheet) disposed on the backlight module R1, and a liquid crystal display panel R3 disposed on the optical film R2, which can include a lower polarizer R31, a lower alignment film (not shown), a liquid crystal layer R32, an upper alignment film, a color filter, and an upper polarizer (not shown).

The backlight module R1 includes a light source array formed by a plurality of light emitting diodes R11 (LEDs) arranged at intervals, and a reflective film R12 disposed between the plurality of light emitting diodes R11 to cover the areas between the plurality of light emitting diodes R11 (as shown in FIG. 2) to prevent light leakage. The light emitted by each of the light emitting diodes R11 includes p-polarized light beams P and n-polarized light beams N. The p-polarized light beams P can pass through the optical film R2 (e.g., a diffusion film) and the lower polarizer R31 of the liquid crystal display panel R3, and then proceed towards the liquid crystal layer R32.

Additionally, the n-polarized light beams N emitted by each of the light emitting diodes R11 are reflected after passing through the optical film R2 and encountering the lower polarizer R31. After being reflected, if the n-polarized light beams N encounter the reflective film R12, the n-polarized light beams N will be reflected again towards the lower polarizer R31, increasing the chances of passing through the lower polarizer R31.

However, if the n-polarized light beams N that are reflected do not encounter the reflective film R12 but encounter the light emitting diode R11, the n-polarized light beams N will not be reflected and will dissipate within the backlight module R1. As a result, the light emitted by the light source array of the light emitting diodes R11 in the backlight module R1 will not completely pass through the lower polarizer R31 and will proceed towards the liquid crystal layer R32, leading to poor light utilization (e.g., decreased display brightness and increased power consumption).

Based on current trends of backlight development, which are moving from cold cathode fluorescent lamps (CCFL) and light emitting diodes towards mini light emitting diodes (i.e., mini LEDs or sub-millimeter light-emitting diodes), a packing density of the mini light emitting diodes will continue to increase. If the conventional architecture is used in design of LCDs, the area that the reflective film R12 of the backlight module R1 can cover will be significantly decreased, resulting in a substantial reduction in light utilization of the backlight module, lowering brightness of output images of the liquid crystal display, and making the conventional liquid crystal display R less competitive in the market against liquid crystal displays based on an edge-lit LED backlight architecture.

SUMMARY OF THE DISCLOSURE

In response to the above-referenced technical inadequacies, the present disclosure provides a liquid crystal display that can significantly enhance light source utilization efficiency, effectively prevent light loss, and increase image display brightness under conditions of lower power consumption.

In order to solve the above-mentioned problems, one of the technical aspects adopted by the present disclosure is to provide a liquid crystal display that includes a backlight module, a reflective filter film, and a wavelength conversion film. The backlight module includes a plurality of light emitting diodes arranged at intervals from each other, and each of the light emitting diodes is capable of emitting a first light.

The reflective filter film is disposed on one side of the backlight module to receive the first light, in which the reflective filter film has following spectral characteristics. The reflective filter film allows light beams within a first wavelength range to at least partially pass therethrough, in which the first wavelength range is between 370 nanometers and 450 nanometers. The reflective filter film is capable of at least partially blocking light beams within a second wavelength range from passing therethrough and reflecting the light beams within the second wavelength range, in which the second wavelength range is between 450 nanometers and 900 nanometers.

The wavelength conversion film is disposed on a side of the reflective filter film away from the backlight module, in which the wavelength conversion film is capable of converting a wavelength of the first light to form a second light.

In one of the possible or preferred embodiments, the reflective filter film has a first light transmittance for the light beams within the first wavelength range, and the reflective filter film has a second light transmittance for the light beams within the second wavelength range, in which the first light transmittance is greater than the second light transmittance.

In one of the possible or preferred embodiments, in the spectral characteristics of the reflective filter film, the first wavelength range is between 370 nanometers and 425 nanometers, and the second wavelength range is between 450 nanometers and 850 nanometers.

In one of the possible or preferred embodiments, the first light transmittance is not less than 50%, and the second light transmittance is not greater than 25%.

In one of the possible or preferred embodiments, each of the light emitting diodes is a sub-millimeter light emitting diode (mini LED), the first light emitted from each of the light emitting diodes has a first light wavelength between 370 nanometers and 450 nanometers, and the second light formed by the wavelength conversion film has a second light wavelength between 450 nanometers and 900 nanometers.

In one of the possible or preferred embodiments, the reflective filter film completely covers the plurality of light emitting diodes of the backlight module.

In one of the possible or preferred embodiments, the liquid crystal display further includes an optical film and a polarizer film.

The optical film is disposed on a side of the wavelength conversion film away from the reflective filter film to allow the second light to pass therethrough, in which the optical film is at least one of a light diffusion film, a collimation film, and a prism sheet. The polarizer film is disposed on a side of the optical film away from the wavelength conversion film, in which the polarizer film is a reflective polarizer film, and the polarizer film allows p-polarized light beams in the second light to pass therethrough and reflects n-polarized light beams in the second light.

In one of the possible or preferred embodiments, after the polarizer film reflects the n-polarized light beams in the second light, the n-polarized light beams are able to pass sequentially through the optical film and the wavelength conversion film along a reflective path to irradiate the reflective filter film, and then the reflective filter film reflects the n-polarized light beams again to irradiate the polarizer film along another reflective path.

In one of the possible or preferred embodiments, the reflective filter film is formed by stacking multiple layers of inorganic films or polymer films with different refractive indices. In one of the possible or preferred embodiments, the wavelength conversion film is a quantum dot film.

Therefore, in the liquid crystal display provided by the embodiment of the present disclosure, by virtue of "a reflective filter film being disposed on a side of the backlight module (to receive the first light) and having the following spectral characteristics: the reflective filter film allows light beams within a first wavelength range to at least partially pass therethrough, in which the first wavelength range is between 370 nanometers and 450 nanometers, and the reflective filter film can at least partially block light beams within a second wavelength range from passing therethrough and reflect the light within the second wavelength range, in which the second wavelength range is between 450 nanometers and 900 nanometers," and "a wavelength conversion film being disposed on a side of the reflective filter film away from the backlight module and being capable of converting a wavelength of the first light to form a second light," the liquid crystal display can significantly enhance light source utilization efficiency, effectively prevent light loss, and increase image display brightness under conditions of lower power consumption.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
FIG. 1 is a schematic view of a conventional liquid crystal display in the related art.
Figure 2:
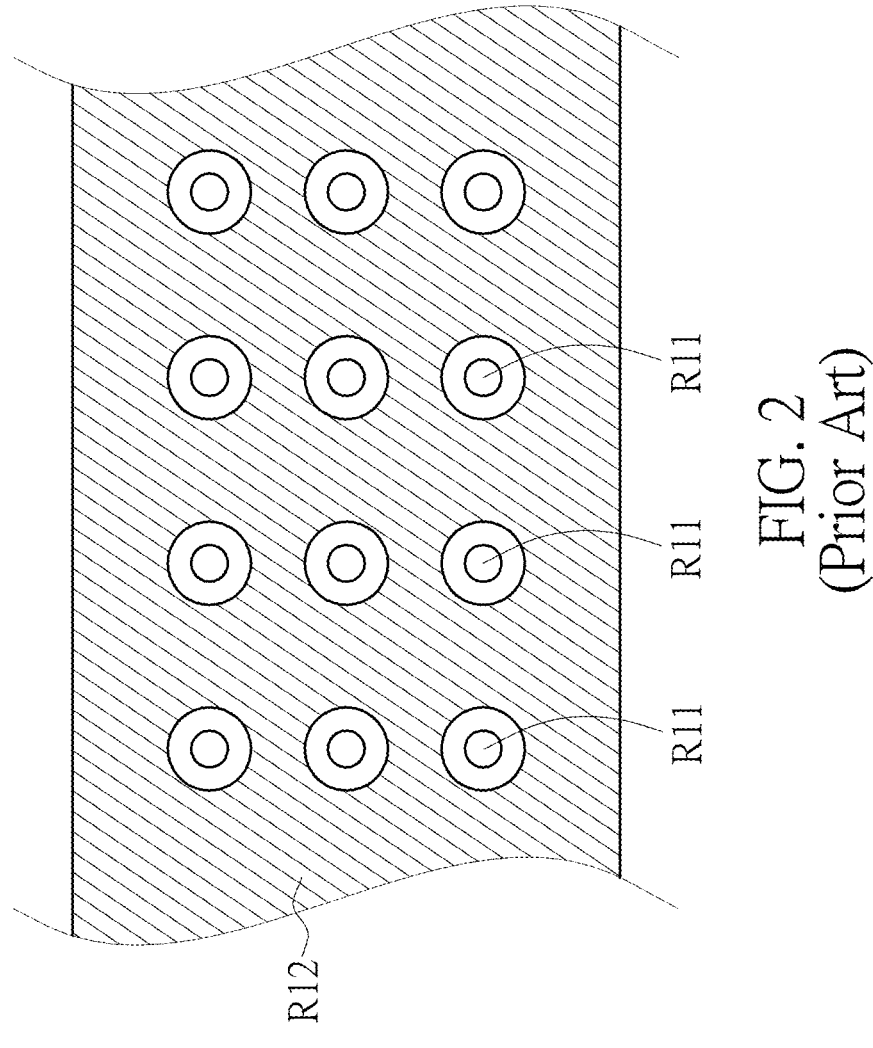
FIG. 2 is a schematic view showing an arrangement of a reflective film in a backlight module of the conventional liquid crystal display in the related art.
Figure 2:
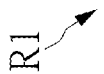

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 3:
FIG. 3 is a schematic view of a liquid crystal display according to an embodiment of the present disclosure.
Figure 4:
FIG. 4 is a schematic view showing a light path of light beams emitted from a backlight module of the liquid crystal display in FIG. 3.
Figure 5:
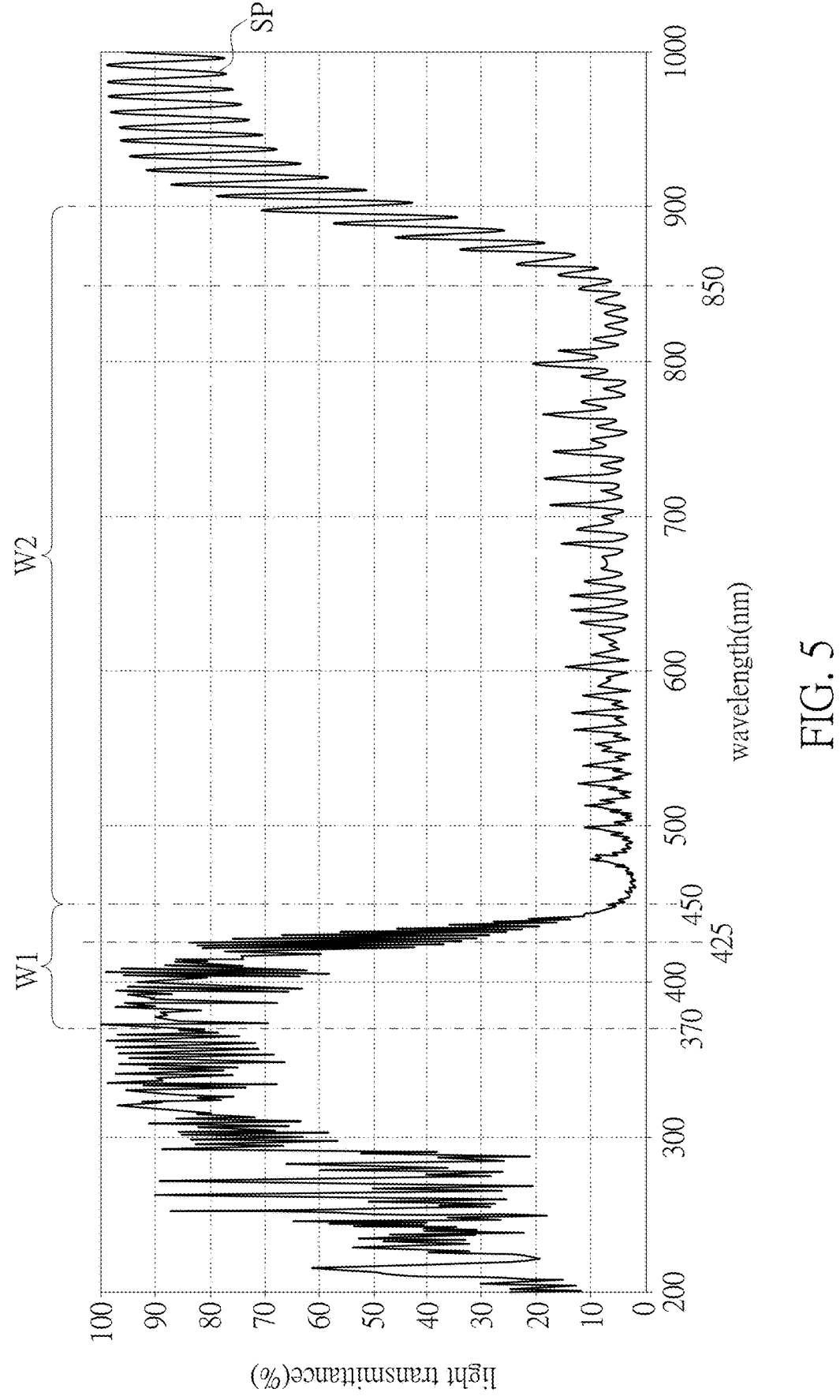
FIG. 5 is a schematic view of spectral characteristics of the light beams emitted from the backlight module of the liquid crystal display in FIG. 3.

Referring to FIGS. 3 to 5, an embodiment of the present disclosure provides a liquid crystal display (LCD) E that at least includes a backlight module 1, a reflective filter film 2, and a wavelength conversion film 3. In the present embodiment, the liquid crystal display E further includes an optical film 4 and a polarizer film 5, and can optionally include other functional layers of a liquid crystal display panel, such as upper and lower alignment films, a liquid crystal layer, and a color filter, but the present disclosure is not limited thereto.

The backlight module 1 includes a plurality of light emitting diodes 11 (LEDs), and the plurality of light emitting diodes 11 are arranged at intervals to form a light source array. In some embodiments of the present disclosure, each of the light emitting diodes 11 is a sub-millimeter light emitting diode (i.e., mini LED) or a direct-lit light emitting diode (i.e., direct-lit LED), but the present disclosure is not limited thereto.

For example, in some other embodiments of the present disclosure, each of the light emitting diodes 11 can also be a conventional light emitting diode or a micro light emitting diode (micro LED).

Preferably, each of the light emitting diodes 11 is a sub-millimeter light emitting diode, with a chip size approximately between 100 micrometers and 200 micrometers. Furthermore, a spacing gap between any two adjacent light emitting diodes 11 is approximately between 100 micrometers and 300 micrometers, and no reflective film is disposed between any two adjacent light emitting diodes 11, but the present disclosure is not limited thereto.

Furthermore, each of the light emitting diodes 11 is configured to emit a first light L1, and the first light L1 has a wavelength between 370 nanometers and 450 nanometers. That is, the first light L1 appears as blue or violet light.

Referring to FIGS. 3 to 5, the reflective filter film 2 is disposed on a side surface of the backlight module 1 and completely covers the plurality of light emitting diodes 11 of the backlight module 1 so that the light beams emitted by each of the light emitting diodes 11 will irradiate the reflective filter film 2.

In the present embodiment, the reflective filter film 2 has the following spectral characteristics SP. The reflective filter film 2 allows light beams within a first wavelength range W1 to at least partially pass therethrough. The first wavelength range is between 370 nanometers and 450 nanometers, and preferably between 370 nanometers and 425 nanometers.

The reflective filter film 2 can at least partially block light beams within a second wavelength range W2 and reflect the light beams within the second wavelength range W2. The second wavelength range W2 is between 450 nanometers and 900 nanometers, and preferably between 450 nanometers and 850 nanometers.

From another perspective, referring to FIG. 5, the reflective filter film 2 has a first light transmittance for the light beams within the first wavelength range W1, and a second light transmittance for the light beams within the second wavelength range W2.

The first light transmittance (or an average value of the first light transmittance) is greater than the second light transmittance (or an average value of the second light transmittance).

The first light transmittance of the reflective filter film 2 for the light beams within the first wavelength range W1 is not less than 50%, preferably not less than 60%, and more preferably between 60% and 99.9%.

The second light transmittance of the reflective filter film 2 for the light beams within the second wavelength range W2 is not greater than 25%, preferably not greater than 20%, and more preferably between 1% and 20%. Further, a light reflectance of the reflective filter film 2 for the light beams within the second wavelength range W2 is not less than 75%, preferably not less than 80%, and more preferably not less than 99%. That is, at least 75% of the light beams within the second wavelength range W2 can be reflected by the reflective filter film 2.

In the present embodiment, the reflective filter film 2 is formed by stacking multiple layers of inorganic films and/or polymer films with different refractive indices, thereby providing wavelength selectivity for light transmittance and high reflectance for specific wavelengths of light. The reflective filter film 2 has good chemical and physical stability, which can allow the reflective filter film 2 to resist environmental factors such as temperature changes and humidity so as to be suitable for long-term use.

In the present embodiment, the reflective filter film 2 is a multi-layers stacked film with a total thickness of about 25 to 50 micrometers, which are formed by two polymer materials with different refractive indices.

From the spectrum shown in FIG. 5, the light transmittance undergoes a significant change at approximately 450 nanometers, so that the reflective filter film 2 allows the light beams with a wavelength less than 450 nanometers and preferably less than 425 nanometers (i.e., within the first wavelength range W1) to pass therethrough, while the light beams with a wavelength between 450 to 850 nanometers (i.e., within the second wavelength range W2) cannot pass through the reflective filter film 2, and most of the light beams within the second wavelength range is reflected by the reflective filter film 2, but the present disclosure is not limited thereto. Accordingly, the first light L1 emitted by each of the light emitting diodes 11 (with a wavelength between 370 nanometers and 450 nanometers) can mostly pass through the reflective filter film 2, so as to achieve a higher light utilization efficiency.

It is worth mentioning that the light transmittance of the reflective filter film 2 can be tested according to ASTM D1003, and the light reflectance of the reflective filter film 2 can be tested according to ASTM E903, but the present disclosure is not limited thereto.

Furthermore, the wavelength conversion film 3 is disposed on a side surface of the reflective filter film 2 away from the backlight module 1. The wavelength conversion film 3 is used to convert a wavelength of the light passing through the reflective filter film 2.

In the present embodiment, the wavelength conversion film 3 has the following optical characteristics.

The wavelength conversion film 3 can convert the wavelength of the first light L1 that passes through the reflective filter film 2 to form a second light L2. The second light L2 has a wavelength between 450 nanometers and 900 nanometers, and preferably between 450 nanometers and 850 nanometers. That is, the second light L2 appears as visible light in the R, G, B range (i.e., red light, green light, or blue light).

Furthermore, the wavelength conversion film 3 is a quantum dot film. The quantum dot film is made of nanoscale quantum dots (semiconductor materials) that can absorb light having specific wavelengths and re-emit light of different wavelengths.

When the first light L1 passes through the reflective filter film 2 and irradiates the wavelength conversion film 3 (i.e., quantum dot film), the quantum dots in the wavelength conversion film 3 absorb the first light L1 and emit a second light L2 with a wavelength between 450 nanometers and 900 nanometers (preferably between 450 nanometers and 850 nanometers). Therefore, the wavelength conversion film 3 can effectively convert the incident light into visible light within the R, G, B range, thereby achieving efficient wavelength conversion.

The aforementioned properties of the wavelength conversion film 3 (quantum dot film) can significantly enhance the color saturation and brightness of the display, providing more vivid and accurate color performance.

Furthermore, the optical film 4 is disposed on a side of the wavelength conversion film 3 away from the reflective filter film 2.

In the present embodiment, the optical film 4 is spaced apart from the wavelength conversion film 3, but the present disclosure is not limited thereto. The optical film 4 can also be attached to the wavelength conversion film 3.

The optical film 4 is configured to allow the second light L2, which is formed by the wavelength conversion of the light passing through the wavelength conversion film 3, to pass therethrough, and then the second light L2 proceeds towards the polarizer film 5 (e.g., the lower polarizer) of the liquid crystal display panel.

The optical film 4 can be, for example, at least one of a light diffusion film, a collimation film, and a prism sheet. In the present embodiment, the optical film 4 is a light diffusion film. For example, the light diffusion film is used to uniformly scatter the incident light (i.e., the second light L2), reducing the phenomenon of uneven brightness, thereby providing a more uniform light source. The light diffusion film is made of a material with micro-particles or surface microstructures, which causes the light to undergo multiple scatterings as the light passes through the film, thereby achieving a light diffusion effect.

Additionally, the collimation film focuses the scattered light, thereby improving the utilization efficiency and brightness of the light. Through special optical design, the collimation film can converge light from different directions into a more concentrated area, thereby enhancing the brightness and contrast of the display.

Furthermore, the prism sheet changes the path of light through internal micro-prism structures, controlling directionality of the light to improve the brightness and contrast of the display. The prism sheet can refract and reflect light according to the designed path, guiding the light to the desired location.

The configuration of the optical film 4 components can be varied according to product design requirements, and the present disclosure is not limited thereto.

Furthermore, the polarizer film 5 is disposed on a side of the optical film 4 away from the wavelength conversion film 3. In the present embodiment, the polarizer film 5 is spaced apart from the optical film 4, but the present disclosure is not limited thereto.

The polarizer film 5 can be, for example, a lower polarizer of a liquid crystal display panel, which allows a portion of the second light L2, formed by the wavelength conversion of the light passing through the wavelength conversion film 3, to pass therethrough while reflecting another portion of the second light L2.

More specifically, the polarizer film 5 is a reflective polarizer film, and the second light L2 includes p-polarized light beams L2P and n-polarized light beams L2N. The polarizer film 5 allows the p-polarized light beams L2P in the second light L2 to pass therethrough, while reflecting the n-polarized light beams L2N in the second light L2.

According to the above configuration, referring to FIG. 4, when the liquid crystal display E is operated, the plurality of light emitting diodes 11 (e.g., mini LEDs) of the backlight module 1 emit first light L1 with a wavelength between 370 nanometers and 450 nanometers.

The reflective filter film 2 allows the first light L1 to pass therethrough while blocking light beams outside the aforementioned wavelength range (i.e., 370 nanometers to 450 nanometers). Then, the wavelength conversion film 3 converts the first light L1, which passes through the reflective filter film 2, into a second light L2 with a wavelength between 450 nanometers and 900 nanometers. Subsequently, the optical film 4 (e.g., a light diffusion film, collimation film, or prism sheet) allows the second light L2 to pass therethrough.

Finally, the polarizer film 5 allows the p-polarized light beams L2P in the second light L2 to pass therethrough and travel towards the liquid crystal layer, while reflecting the n-polarized light beams L2N in the second light L2.

After being reflected by the polarizer film 5, the n-polarized light beams L2N in the second light L2 can sequentially pass through the optical film 4 and the wavelength conversion film 3 according to a reflective path, and then be irradiated back onto the reflective filter film 2. The reflective filter film 2 can reflect the n-polarized light beams L2N again, causing the n-polarized light beams L2N to sequentially pass through the wavelength conversion film 3 and the optical film 4 according to another reflective path, and then be reflected back to the polarizer film 5, so as to increase the chances for the n-polarized light beams L2N in the second light L2 to pass through the polarizer film 5.

It is worth mentioning that, since the reflective filter film 2 has the optical characteristics of blocking and reflecting the light within the second wavelength range W2 (450 to 900 nanometers, preferably 450 to 850 nanometers) from passing therethrough, the second light L2 with the wavelength between 450 nanometers and 900 nanometers (preferably between 450 nanometers and 850 nanometers, specifically the n-polarized light beams L2N in the second light L2), will not be able to pass through the reflective filter film 2 after being reflected by the polarizer film 5, but will be reflected back again by the reflective filter film 2.

Additionally, since the reflective filter film 2 completely covers the plurality of light emitting diodes 11 in the backlight module 1, all of the n-polarized light beams L2N that are reflected by the polarizer film 5 will be reflected back again by the reflective filter film 2, thereby preventing the situation in the related art where the reflected light does not encounter the reflective film and may be lost in the backlight module 1.

Beneficial Effects of the Embodiments

In conclusion, in the liquid crystal display provided by the embodiment of the present disclosure, by virtue of "a reflective filter film disposed on a side of the backlight module to receive the first light; in which the reflective filter film has following spectral characteristics: the reflective filter film allows light beams within a first wavelength range to at least partially pass therethrough; in which the first wavelength range is between 370 nanometers and 450 nanometers; the reflective filter film can at least partially blocklight beams within a second wavelength range from passing therethrough and reflect the light within the second wavelength range; in which the second wavelength range is between 450 nanometers and 900 nanometers," and "a wavelength conversion film disposed on a side of the reflective filter film away from the backlight module, and the wavelength conversion film can convert a wavelength of the first light to form a second light," the liquid crystal display can significantly enhance light source utilization efficiency, effectively prevent light loss, and increase image display brightness under conditions of lower power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A liquid crystal display, comprising:

a backlight module including a plurality of light emitting diodes arranged at intervals from each other, each of the light emitting diodes being configured to emit a first light, wherein the first light is a violet or near-ultraviolet light having a wavelength greater than 370 nanometers and less than 440 nanometers;

a reflective filter film disposed on a side of the backlight module to receive the first light, wherein the reflective filter film has following spectral characteristics:

the reflective filter film allows light beams within a first wavelength range to at least partially pass therethrough, wherein the first wavelength range is between 370 nanometers and 450 nanometers;

the reflective filter film is configured to at least partially block light beams within a second wavelength range from passing therethrough and reflecting the light beams within the second wavelength range, wherein the second wavelength range is between 450 nanometers and 900 nanometers; wherein a light reflectance of the reflective filter film for the light beams within the second wavelength range is greater than or equal to 75%; and a wavelength conversion film disposed on a side of the reflective filter film away from the backlight module, wherein the wavelength conversion film is configured to convert a wavelength of the first light to form a second light;

wherein the second light includes at least one of red light, green light and blue light, wherein the second light has a wavelength of between 450 nanometers and 900 nanometers and does not overlap with the wavelength of the first light;

wherein, when the second light encounters the reflective filter film after being reflected, at least 75% of the blue light of the second light is reflected by the reflective filter film and does not return to the backlight module.

2. The liquid crystal display according to claim 1, wherein the reflective filter film has a first light transmittance for the light beams within the first wavelength range, and the reflective filter film has a second light transmittance for the light beams within the second wavelength range, and wherein the first light transmittance is greater than the second light transmittance.

3. The liquid crystal display according to claim 1, wherein, in the spectral characteristics of the reflective filter film, the first wavelength range is between 370 nanometers and 425 nanometers, and the second wavelength range is between 450 nanometers and 850 nanometers.

4. The liquid crystal display according to claim 3, wherein the first light transmittance is between 60% and 99.9%, and the second light transmittance is between 1% and 20%, and the light reflectance of the reflective filter film for the light beams within the second wavelength range is greater than or equal to 99%.

5. The liquid crystal display according to claim 1, wherein each of the light emitting diodes is a sub-millimeter light emitting diode, each of the light emitting diodes has a chip size between 100 micrometers and 200 micrometers, and a spacing gap between any two adjacent light emitting diodes is between 100 micrometers and 300 micrometers.

6. The liquid crystal display according to claim 1, wherein the reflective filter film completely covers the plurality of light emitting diodes of the backlight module.

7. The liquid crystal display according to claim 1, further comprising:

an optical film disposed on a side of the wavelength conversion film away from the reflective filter film to allow the second light to pass therethrough, wherein the optical film is at least one of a light diffusion film, a collimation film, and a prism sheet; and a polarizer film disposed on a side of the optical film away from the wavelength conversion film, wherein the polarizer film is a reflective polarizer film, and the polarizer film allows p-polarized light beams in the second light to pass therethrough and reflects n-polarized light beams in the second light.

8. The liquid crystal display according to claim 7, wherein, after the polarizer film reflects the n-polarized light beams in the second light, the n-polarized light beams pass sequentially through the optical film and the wavelength conversion film along a reflective path to irradiate the reflective filter film, and then the reflective filter film reflects the n-polarized light beams again to irradiate the polarizer film along another reflective path.

9. The liquid crystal display according to claim 1, wherein the reflective filter film is formed by stacking multiple layers of inorganic films or polymer films with different refractive indices.

10. The liquid crystal display according to claim 1, wherein the wavelength conversion film is a quantum dot film.

* * * * *